J. A. CALDWELL.
ELLIPSOGRAPH.
APPLICATION FILED OCT. 12, 1916.
1,235,108.
Patented July 31, 1917.
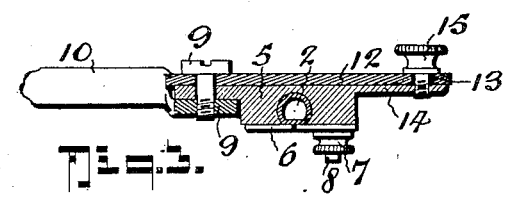
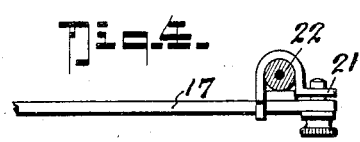
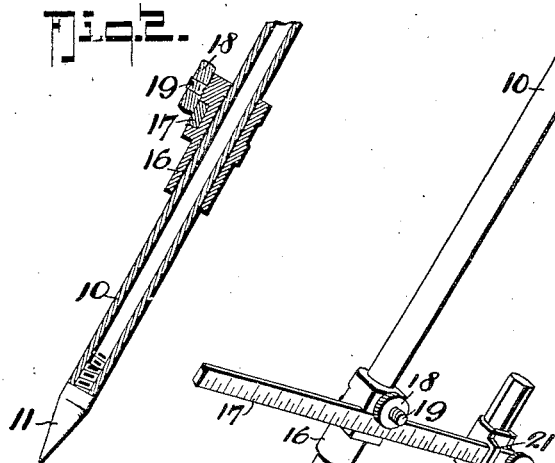
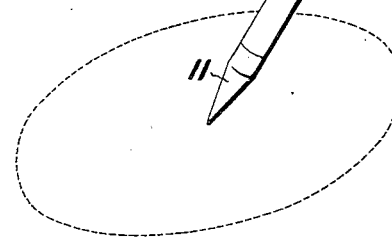
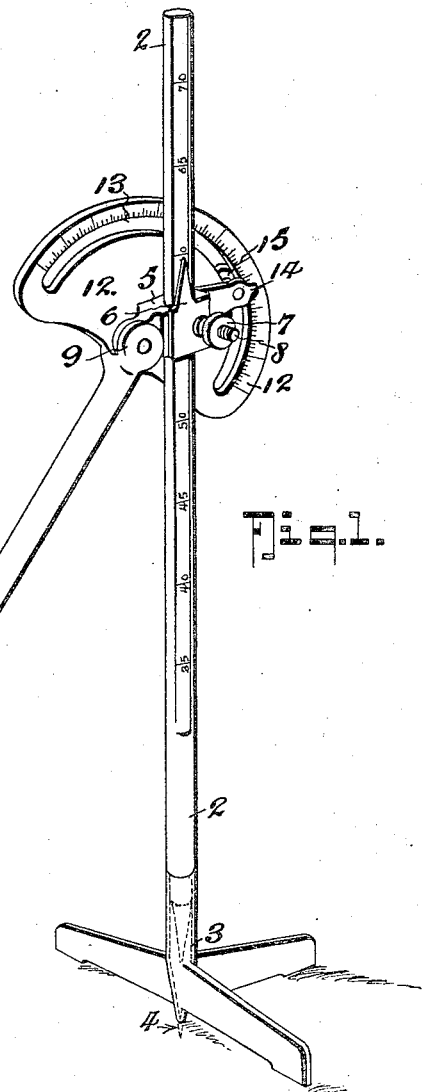
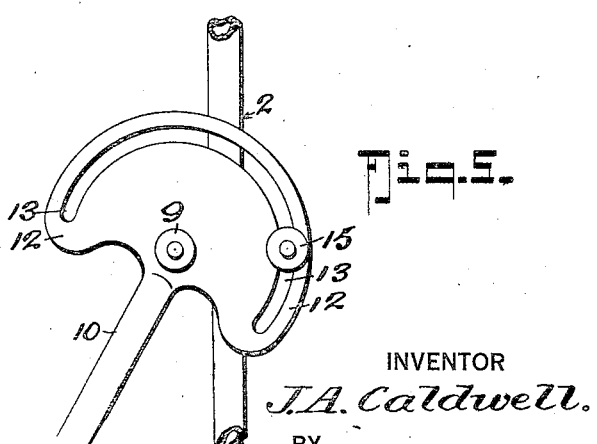
INVENTOR
J. A. Caldwell.
BY
Fred G. Dieterich
ATTORNEYS

UNITED STATES PATENT OFFICE.

JOHN A. CALDWELL, OF VANCOUVER, BRITISH COLUMBIA, CANADA.

ELLIPSOGRAPH.

1,235,108.  Specification of Letters Patent.  Patented July 31, 1917.

Application filed October 12, 1916. Serial No. 125,283.

*To all whom it may concern:*

Be it known that I, JOHN A. CALDWELL, a citizen of the Dominion of Canada, residing at Vancouver, in the Province of British Columbia, Canada, have invented certain new and useful Improvements in Ellipsographs, of which the following is a specification.

This invention relates to an ellipsograph which is an improvement on that on which Patent No. 530,822 was granted to me on the 11th December 1894.

The invention is fully set forth in the following specification, reference being made to the drawings by which it is accompanied, in which:

Figure 1 is a perspective view showing the device as applied to trace an ellipse.

Fig. 2 is a section through the attachment of the radius arm to the sleeve of the axial stem.

Fig. 3 is a section through the attachment of the axial stem to the uprights.

Fig. 4 is a plan of the attachment of the tracing point to the end of the radius rod.

Fig. 5 is a rear elevation of the radius arm adjusting means.

In these drawings 2 represents an upright or supporting leg of uniform cross section, which leg is pointed at its lower end and has removably attached to it a tripod 3. This tripod has a point 4 projecting slightly beyond its feet in alinement with the axis of the leg 2 and the two front feet of the tripod and the point 4 are in a straight line.

The tripod will sustain the leg in a perpendicular position, when such is required, while the point 4 enables the axis of the leg to be definitely located and prevents lateral displacement. The position of two of the feet of the tripod in a straight line with the point enables the leg to be inclined forward when desired, in a vertical plane through the point 4.

On this rod 2 is endwise movable a sleeve 5 which is provided with a clamp 6 engaging a slight flat along one side of the leg to assist the clamp in preventing the sleeve turning on the leg. The clamp 6 is pointed at its upper end to facilitate endwise adjustment of the sleeve to graduations with which the leg is provided and which will be explained later. The clamp 6 is tightened to secure the sleeve on the leg by a knurled nut 7 threaded on a screw 8 secured in the sleeve.

To this sleeve 5 is pivotally connected by a hinge joint 9, a similar leg 10 of uniform cross section, which leg is provided with a removable point 11 at its free end. Secured to the pivot end of this leg 10 is a flattened sector 12 having a concentric slot 13. This sector enables the leg 10 to be secured at any desired position of angular adjustment in relation to the leg 2 by a screw 15 having a knurled head, which screw passes through the slot 13 and is threaded into a projection 14 from the side of the sleeve 5. The edge of the segment 12 may be marked in degrees and the projection 14 extended to afford an indicating pointer to facilitate adjustment to any desired angle.

The upright leg 2 is marked in units of lineal measurement and also in vertical heights corresponding to degrees of angular variation which the leg 10 as the hypotenuse of fixed length in a right angled triangle makes with it.

On the leg 10 a sleeve 16 is freely movable and across this sleeve a graduated radius bar 17 is slidably adjustable in a slot provided for it, and may be secured in any desired position of endwise adjustment by a knurled nut 18 threaded on a screw 19 secured in the body of the sleeve. To the zero end of this bar 17 is secured by a strap clamp and screw 21 a tracing point 22 or other marking means.

In use, if the ellipse required is the oblique intersection of a cylinder, of known diameter at a known angle, the radius bar 17 is adjusted to the radius of the cylinder and secured and the sleeve 4 is adjusted and secured on the leg 2 to the vertical height corresponding to the angle at which the plane of intersection cuts the cylinder. The leg 10 being set lightly by means of the sector 12 as nearly as possible to the same angle, the point 11 of the leg 10 is placed on the intersection of the major and minor axes of the ellipse required and the point 4 of the tripod 3 is set on the line of the major axis produced, so that the leg 2 is perpendicular.

The tracing point 22 at the end of the radius bar 17 may then be applied to the surface to trace the required ellipse: Starting at one end of the minor axis to the half of which, or radius of the cylinder, the radius bar has been set, the sleeve 16 will move around and up the leg 10 as the point 22 traces the curve of the ellipse until the end of the major axis is reached, and will move gradually around and down the leg while tracing the other quarter. The leg 2 may then be transferred to a corresponding position on the major axis produced on the opposite side of the ellipse, to trace the other half of it.

It will be obvious that if the cylinder being intersected is a hollow one, the radius bar may be adjusted to or from the axis of its sleeve an amount equal to the thickness of the cylinder, and the lines traced will be a correct representation of the intersection of the cylindrical shell.

If it is required to trace an ellipse, the major and minor axes of which only are known, the radius bar 17 is adjusted to half the minor axis and the sleeve 4 being slackened on the leg 2 and the pivot 9 slackened at the sector, the point 11 of the leg 10 is placed on the intersection of the major and minor axes and the leg 10 is inclined in a vertical plane through the major axis, until the tracing point 22 is at the adjacent end of the major axis of the required ellipse. The sleeve 4 and pivot 9 are then clamped to support the leg 10 at that angle and the ellipse may be traced in the manner previously described.

It will be noticed that by adjustment of the angle which the leg 10 makes with the plane on which the ellipse is to be traced and by adjustment of the radius bar an ellipse of any required proportion may be traced, so that parallel ellipses may be drawn as well as ellipses which represent oblique views of concentric circles.

The essential point of difference between this invention and that set forth in the patent before referred to, lies in the adjustability of the position of the pivot on the leg 2, and in the provision whereby that leg may be maintained not only in a vertical plane but in a perpendicular position when required. This simplifies the use of the device and also enables it to be used within a more limited space.

Improvements are also introduced in the structural character of the parts and their attachments.

Having now particularly described my invention, I hereby declare that what I claim as new and desire to be protected in by Letters Patent, is:

1. An ellipsograph, comprising in combination, a pair of pointed compass legs pivotally connected, the pivotal connection of one leg being adjustable endwise on the other, and the pivoted leg having secured to it a sector by which its movement on the pivot may be adjusted and secured, means removably attached to the pointed end of the leg on which the pivot is adjustable for supporting that leg in a perpendicular position, a sleeve having a slot and freely movable on the pivoted leg, a radius bar adjustable endwise in said slot and means attached to this radius bar for carrying a tracing point or the like.

2. An ellipsograph, comprising in combination, a compass leg pointed at one end, means removably attached to the pointed end for supporting the leg perpendicularly, a sleeve endwise movable on this leg with provision for clamping it at any desired position of endwise adjustment, a second leg having a removable point, said second leg being pivotally connected to the sleeve and having means adjacent the pivot for clamping it at any desired position of angular adjustment, a sleeve freely movable on the pivot leg, a radius bar endwise adjustable across the sleeve at right angles to its axis, and means on the radius bar for securing to it a tracing point or the like.

3. An ellipsograph, comprising in combination, a tubular leg pointed at one end, means removably attached to the pointed end for supporting the leg perpendicularly and for preventing lateral displacement, a sleeve endwise movable on this leg, means for securing it at any desired position of endwise adjustment, a second tubular leg pivotally connected to the sleeve and having means adjacent the pivot for securing the leg at any desired position of angular adjustment, a removable point socketed in the end of the pivoted leg, a sleeve freely movable on the pivoted leg, a graduated radius bar endwise adjustable across the sleeve at right angles to its axis, and means on the zero end of the radius bar for securing a tracing point or the like.

4. An ellipsograph, comprising in combination, a graduated tubular leg pointed at one end, a tripod removably attached to the pointed end, two feet of the tripod being in a straight line with the axis of the leg, said tripod being provided with a point projecting slightly beyond the plane of the feet in alinement with the axis of the leg, a sleeve endwise movable on this leg, said sleeve being open on one side, a clamp across the said open side, a nut and a screw secured in the sleeve that fastens the clamp, said clamp being also produced upward to form an indicating point, a second tubular leg pivotally connected to the sleeve and having a sector secured on it concentric with the pivot, said sector having a concentric slot, a headed screw, said headed screw being passed through said concentric slot, and said sleeve having a projection in which said screw is secured, a removable point socketed in the free end of the pivoted leg, a sleeve freely movable on the pivoted leg, said sleeve having a slot across it in a plane parallel and at right angles to its axis, a graduated radius bar endwise movable in the slot, a screw secured in the sleeve adjacent the slot and a knurled nut on the screw by which the radius bar may be secured, and a screw clamp on the zero end of the radius bar by which a tracing point may be secured to it.

5. An ellipsograph, comprising in combination, a tubular leg pointed at one end and graduated in units of lineal measurement and in vertical heights corresponding to various angles, a tripod removably attached to the pointed end of the leg, said tripod having a point projecting slightly beyond its feet in alinement with the axis of the leg, a sleeve susceptible of endwise movement on the leg and provided with a clamp by which it may be secured in any desired position of endwise adjustment, a second tubular leg pivotally mounted on the sleeve, said leg having at one end a point removably socketed within the tube and having adjacent its pivot a sector with a concentric slot, a screw passing through said sector slot to secure it to the sleeve at any desired angular adjustment, a sleeve freely movable on this second leg, said sleeve having a transverse slot, a graduated radius bar endwise movable in the slot of the sleeve, means for securing the radius bar in any desired position of endwise adjustment and a tracing point removably secured at the zero end of the radius bar.

6. An ellipsograph, comprising in combination, a compass leg pointed at one end and having removably attached to the pointed end a means for supporting the leg in a perpendicular position, said supporting means having a point in alinement with the axis of the leg and projecting slightly beyond the support, a sleeve endwise movable on the leg, said sleeve being open on one side and having a clamp on the open side, a screw and a nut that secure the clamp to the sleeve, a second leg pivotally mounted to the sleeve, said leg having a removable point at its free end and a sector secured adjacent and concentric with its pivot, said sector having a concentric groove, a screw threaded into the sleeve and passing through said sector, a sleeve freely movable on the pivoted leg, a radius bar endwise movable in a slot across the sleeve, means for securing the radius bar in the slot, and a clamp at the end of the radius bar adapted to secure a tracing point or the like.

In testimony whereof I affix my signature.

JOHN A. CALDWELL.